United States Patent
Zömbik et al.

(10) Patent No.: US 9,762,554 B2
(45) Date of Patent: Sep. 12, 2017

(54) HANDLING OF PERFORMANCE MONITORING DATA

(71) Applicant: Telefonaktiebolaget L M Ericsson (publ), Stockholm (SE)

(72) Inventors: László Zömbik, Zalaegerszeg (HU); József Barta, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/787,484

(22) PCT Filed: May 2, 2013

(86) PCT No.: PCT/EP2013/059147
§ 371 (c)(1),
(2) Date: Oct. 28, 2015

(87) PCT Pub. No.: WO2014/177215
PCT Pub. Date: Nov. 6, 2014

(65) Prior Publication Data
US 2016/0080332 A1    Mar. 17, 2016

(51) Int. Cl.
*H04L 29/06* (2006.01)
*H04L 12/24* (2006.01)
*H04L 12/26* (2006.01)

(52) U.S. Cl.
CPC .......... *H04L 63/0435* (2013.01); *H04L 41/28* (2013.01); *H04L 43/04* (2013.01); *H04L 43/065* (2013.01); *H04L 63/062* (2013.01)

(58) Field of Classification Search
USPC ........................................................ 713/168
See application file for complete search history.

(56) References Cited

U.S. PATENT DOCUMENTS

| | | | |
|---|---|---|---|
| 6,324,646 B1 | 11/2001 | Chen et al. | |
| 2003/0028627 A1* | 2/2003 | Barillaud | H04L 67/16 709/222 |

(Continued)

FOREIGN PATENT DOCUMENTS

EP    1814255 A1    8/2007

OTHER PUBLICATIONS

Ericsson, "General Performance Event Handling RNC", Description, 104/1551-AXD 105 03/1 Uen T, Sep. 17, 2012, pp. 1-338, Ericsson.

(Continued)

*Primary Examiner* — Jason Lee
(74) *Attorney, Agent, or Firm* — Coats & Bennett, PLLC

(57) ABSTRACT

System, methods, nodes, and computer program for handling performance monitoring data in a communication network are described. The communication network (100) comprises a plurality of network nodes (102). The performance monitoring data are generated by a network node (102). The performance monitoring data are a stream of data characterizing the performance of the network node (102). The method comprises determining, by the network node (102), whether an encryption condition for encrypting the performance monitoring data is fulfilled. The method further comprises based on the result of determining, encrypting, by the network node (102), the performance monitoring data. The method further comprises subsequent to the encrypting, sending, by the network node (102), the encrypted performance monitoring data to a performance monitoring data collector (112). The method further comprises authorizing, by a security network operation center (114), the performance monitoring data collector (112) to decrypt the encrypted performance monitoring data. The system, nodes, and computer program associated with these methods are (Continued)

also described. Therefore an improved handling of performance monitoring data in a communication network is achieved in terms of improved confidentiality of subscriber data.

17 Claims, 9 Drawing Sheets

(56) References Cited

U.S. PATENT DOCUMENTS

| | | |
|---|---|---|
| 2004/0165727 A1 | 8/2004 | Moreh et al. |
| 2011/0150211 A1* | 6/2011 | Anderson ............... H04L 63/30 380/1 |
| 2012/0096277 A1* | 4/2012 | Perez Soria ....... G06Q 20/3274 713/179 |
| 2014/0082348 A1* | 3/2014 | Chandrasekaran . H04L 63/0254 713/150 |

OTHER PUBLICATIONS

Kaufmann, C., et al., "Internet Key Exchange (IKEv2) Protocol", Network Working Group Request for Comments: 4306, Dec. 1, 2005, pp. 1-99, The Internet Society.

McDonald, D., et al., "PF_KEY Key Management API, Version 2", Network Working Group Request for Comments: 2367, Jul. 1, 1998, pp. 1-68, The Internet Society.

Harkins, D., et al., "The Internet Key Exchange (IKE)", Network Working Group Request for Comments: 2409, Nov. 1, 1998, pp. 1-41, The Internet Society.

Ericsson, "Introduction to OSS-RC", Description, 1555-AOM 901 075 Uen K, Nov. 26, 2012, pp. 1-111, LM Ericsson.

Enns, R., et al., "Network Configuration Protocol (NETCONF)", Internet Engineering Task Force (IETF) Request for Comments: 6241, Jun. 1, 2011, pp. 1-113, IETF.

Narayan, K., et al., "External User Security Model (EUSM) for version 3 of the Simple Network Management Protocol", Network Working Group Internet—Draft, Jul. 1, 2004, pp. 1-24, IETF.

\* cited by examiner

HANDLING OF PERFORMANCE MONITORING DATA

TECHNICAL FIELD

The present invention relates to telecommunications and in particular to methods, nodes and computer programs for handling performance monitoring data in a communication network.

BACKGROUND

There is an increasing demand for providing secure handling of sensitive subscriber data. From the early days of mobile telecommunications, solutions for this problem are available in earlier and current networks for subscriber identification.

The increased demand of the mobile networks to provide multiple of services for the customers made it possible to create Performance Monitoring (PM) solutions to monitor and improve a network performance. The introduced PM solutions primarily intend to collect, aggregate and evaluate network related subscriber data.

The current solutions of PM systems are based on events and counters provided by selected network elements. The PM information is collected in network nodes according to predefined subscription profiles. The network nodes store the PM data in PM files covering variable time periods for example 15 minutes or 1 minute.

Additionally, network nodes can make the PM data available on a streaming interface where PM data are provided as a continuous stream. Examples of PM data that can be sensitive are the relatively detailed location of the mobile subscriber. This can be a potential confidentiality threat for a network operator.

In $3^{rd}$ Generation (3G) networks, for example a Radio Network Controller (RNC) is responsible to store and make PM data available for higher layer applications, e.g. a network management system. In a core network, an example of a node creating the PM data is a Serving GPRS Support Node (SGSN) or a Mobile Switching Center (MSC) Server.

Today cryptology is widely used as a mechanism to provide confidentiality of subscriber identification. Those cryptographic algorithms, which are using the same key material for encryption and for decryption, are referred to as symmetric (encryption) algorithms.

Those cryptographic algorithms, which are using different key materials for encryption and for decryption, are referred to as asymmetric encryption algorithms. Asymmetric cryptographic operations are more processor capacity consuming, approximately with three orders of magnitude, than the symmetric encryption algorithms. To improve the efficiency of the usage of the asymmetric encryption algorithms, the current best practice is to encrypt a random data by using an asymmetric encryption algorithm, which is later used to encrypt the confidential data by using a symmetric encryption algorithm.

Internet Key Exchange (IKE) (RFC2409) and IKEv2 (RFC4306) are key management protocols to authenticate the remote peers and agree a shared secret which can be used to generate shared keys for an IP Security (IPsec) security protocol. PF_KEY (RFC2367) defines an interface between a key management application and an engine of the IPsec security protocol.

To meet the increasing demand for secure handling of sensitive subscriber data, an improved handling of performance monitoring data in a communication network is required, matching with the demands of subscriber data confidentiality and at the same time allow for tuning of the performance of network nodes.

SUMMARY

It is an object of the invention to provide measures with which a handling of performance monitoring data in a communication network is improved in respect of confidentiality of subscriber data. It is also an object of the invention to provide corresponding methods, nodes, and computer programs.

The objects defined above are solved by the features of the independent claims. Preferred embodiments of the invention are described in the dependent claims.

According to an exemplary aspect of the invention, a method for handling performance monitoring data in a communication network comprising a plurality of network nodes is provided. The performance monitoring data may be generated by a network node. The performance monitoring data may be a stream of data characterizing the performance of the network node. The method comprises determining, by the network node, whether an encryption condition for encrypting the performance monitoring data is fulfilled. The method comprises based on the result of determining, encrypting, by the network node, the performance monitoring data. The method comprises subsequent to the encrypting, sending, by the network node, the encrypted performance monitoring data to a performance monitoring data collector. The method comprises authorizing, by a security network operation center, the performance monitoring data collector to decrypt the encrypted performance monitoring data.

The method may further comprise that prior to the step of encrypting, determining, by the network node, whether a key agreement condition for agreeing, on an encryption key and a corresponding decryption key is fulfilled. The method may comprise based on a result of determining whether the key agreement condition is fulfilled, performing, by the network node, an agreement negotiation with the security network operation center on an encryption key and a corresponding decryption key.

According to another exemplary aspect of the invention, a method in a security network operation center for handling performance monitoring data in a communication network comprising a plurality of network nodes is provided. The performance monitoring data may be generated by a network node. The performance monitoring data may be a stream of data characterizing the performance of the network node. The method comprises agreeing with the network node on an encryption key and a corresponding decryption key, the network node being authorized to negotiate the encryption key and a corresponding decryption key. The method comprises delivering the decryption key to a performance monitoring data collector, the performance monitoring data collector being authorized to receive the decryption key.

According to another exemplary aspect of the invention, a method in a performance monitoring data collector for handling performance monitoring data in a communication network comprising a plurality of network nodes is provided. The performance monitoring data may be generated by a network node. The performance monitoring data may be a stream of data characterizing the performance of the network node. The method comprises determining whether a decryption condition for decrypting the performance monitoring data is fulfilled, the performance monitoring data being received from the network node. The method comprises based on the result of determining, requesting a decryption key from a security network operation center. The method comprises decrypting the performance monitoring data with a decryption key received from the security network operation center. The method comprises providing the decrypted performance monitoring data to a performance analysis function.

According to another exemplary aspect of the invention, a network node for handling performance monitoring data in a communication network comprising a plurality of network nodes is provided. The performance monitoring data may be generated by a network node. The performance monitoring data may be a stream of data characterizing the performance of the network node. The network node may be capable of generating performance monitoring data. The network node may be capable of determining sensitive data elements of the performance monitoring data. The network node may be capable of encrypting sensitive data elements of the performance monitoring data using an encryption key. The network node may be capable of sending performance monitoring data to a performance monitoring data collector. The network node may be capable of agreeing with an authenticated security network operation center on an encryption key and a corresponding decryption key. The network node may be capable of authenticating the security network operation center. The network node may be capable of storing an agreed encryption key. The network node may be capable of monitoring expiry of the encryption key.

According to another exemplary aspect of the invention, a security network operation center for handling performance monitoring data in a communication network comprising a plurality of network nodes is provided. The performance monitoring data may be generated by a network node. The performance monitoring data may be a stream of data characterizing the performance of the network node. The security network operation center may be capable of agreeing with a network node on an encryption key and a corresponding decryption key. The security network operation center may be capable of authenticating the network node. The security network operation center may be capable of storing an agreed decryption key. The security network operation center may be capable of authorizing a performance monitoring data collector. The security network operation center may be capable of providing the decryption key to the authorized performance monitoring data collector. The security network operation center may be capable of monitoring expiry of the decryption key.

According to another exemplary aspect of the invention, a performance monitoring data collector for handling performance monitoring data in a communication network comprising a plurality of network nodes is provided. The performance monitoring data may be generated by a network node. The performance monitoring data may be a stream of data characterizing the performance of the network node. The performance monitoring data collector may be capable of receiving performance monitoring data from a network node. The performance monitoring data collector may be capable of storing performance monitoring data. The performance monitoring data collector may be capable of determining whether performance monitoring data is encrypted. The performance monitoring data collector may be capable of requesting a decryption key from a security network operation center. The performance monitoring data collector may be capable of authorizing to a security network operation center. The performance monitoring data collector may be capable of decrypting encrypted performance monitoring data. The performance monitoring data collector may be capable of providing the decrypted performance monitoring data to a performance analysis function.

According to another exemplary aspect of the invention, a system for handling performance monitoring data in a communication network comprising a plurality of network nodes is provided. The system may comprising at least one network node, at least one security network operation center, and at least one performance monitoring data collector.

The foregoing and other objects, features and advantages of the present invention will become more apparent in the following detailed description of embodiments of the invention illustrated in the accompanying drawings.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 1:
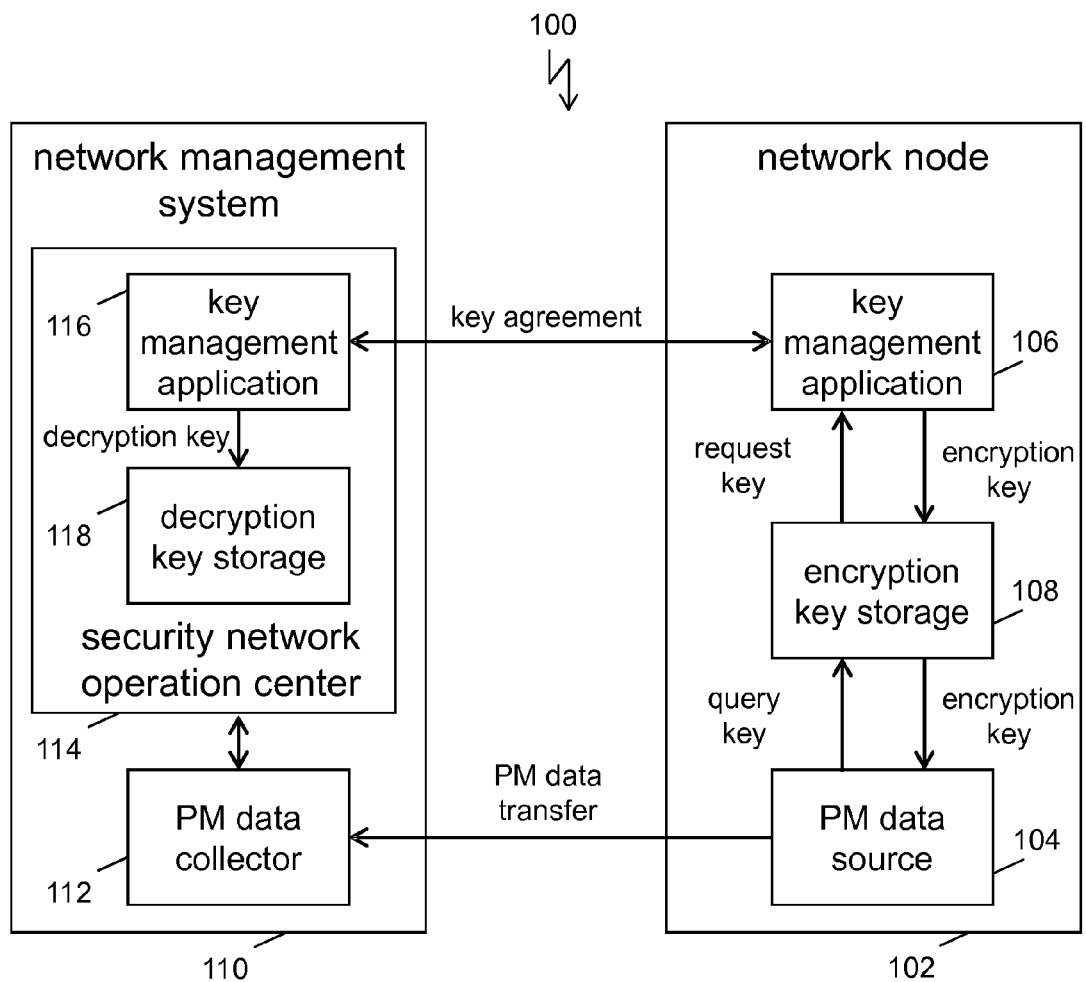
FIG. 1 is block diagram illustrating a system for handling PM data according to an embodiment of the invention.

In the following, methods and network entities for handling PM data and associated computer programs according to the invention are described in more detail.

Within the context of the present application, the term "communication network" may particularly denote a collection of nodes or entities, related transport links, and associated management needed for running a service, for example a telephony service or a packet transport service. Depending on the service, different node types or entities may be utilized to realize the service. A network operator owns the communication network, and offers the implemented services to its subscribers. Typical examples of a communication network are radio access network (such as GSM, 3G, WCDMA, CDMA, LTE, 802.11), mobile backhaul network, or core network (such as an IP Multimedia System, IMS).

Within the context of the present application, the term "network node" may typically be those entities of the communication network handling user traffic, subscriber data, or signaling traffic associated with user traffic in the communication network. In a radio access network, the network node may be, for example, pico-, nano- macro-base stations (RBS), eNodeB base stations, RNC, or associated supporting IP connectivity nodes. In a mobile backhaul network, the network node may be packet aggregation transport nodes and/or nodes related with microwave transport link technologies. In a core network a network node may be a SGSN, Mobility Management Entity (MME), or MSC node. The network node may be embodied of any type of node of a communication network which node is responsible to handle confidential subscriber data.

Within the context of the present application, the term "network management system" may particularly denote a collection of entities responsible for managing the network nodes of the communication network. Typical tasks of a management system is the administration, and handling of information from the network nodes such as alarms, logging of fault reports or performance related information.

Within the context of the present application, the term "security network operation center" may typically be a specific part of the network management system responsible for handling security related management operations, including but not limited to managing keys, digital certificates, or encryption/decryption keys. The access to such a security network operation center within a network management system is typically restricted to very few, selected (screened) and authorized personnel within the network operator.

Within the context of the present application, the term "PM data" may particularly denote information characterizing the performance of a network node. This may be statistical information such as statistic counter, but more particular within the context of this application the logging of events related to a subscriber. This may be information on where a subscriber is located, where he has roamed, and when the subscriber has made or received calls or has done data transfers. Performance data is used by the network operator to assess and optimize the performance of the network nodes and the overall communication network.

Within the context of the present application, the term "performance analysis" may typically be the process of assessing the collected PM data and, by applying specific filter and correlation functions, derive key performance parameters characterizing the network node and the overall network. Two communication networks, or different parts or regions of the communication network may be compared by comparing the key performance parameters, and by this derive performance goals to be applied to the communication network. A performance analysis function may typically be located within or close to a PM data collector. Since a lot of data may be accumulated in a PM data collector, it is not beneficial if all the PM data has to be transported over long distances to the performance analysis function.

Within the context of the present application, the term "stream of PM data" may typically refer to a continuous delivery of PM data. PM data that is related to logging of events related to a subscriber are delivered by the collecting network node to a PM data collector. The delivery of such PM data may be immediate, so at the time the PM data have been generated, but may also be buffered. Buffered means that the collecting network node buffers the PM data until a threshold is reached and then delivers the PM data to a PM data collector. The threshold may be time based, so the stream of PM data is delivered as a burst of data at certain time intervals. In this case the threshold may be data volume related, so if the buffer allocated for collected PM data is full or reaches a certain buffer fill level threshold, the PM data is delivered as a burst of data to a PM data collector. So a stream of PM data refers to any kind of PM data delivery which is not one-time. The PM data delivery may also be triggered by a request from a PM data collector, or a handshake procedure between the collecting network node and a PM data collector.

Within the context of the present application, the term "PM data collector" may typically refer to a central network storage like a Network Attached Storage (NAS). It is used to centrally store the PM data from a large number of network nodes. The PM data collector 112 may be integral part of a network management system 110, but may also be separate or only logically attached to a network management system. A performance analysis function accesses the PM data collector to perform the performance analysis.

The term "key agreement" may typically refer to a key management protocol to agree a shared secret. However, within the context of the present application "key agreement" is defined as peer agreement on an encryption and a decryption key, where the encryption key is determined only at one peer, while the decryption key is determined only at the other peer. Traditional key agreement management protocols such as IKE (RFC2409) or IKEv2 (RFC4306) may be used to implement this.

Within the context of the present application, the term "encryption" may typically refer to a data manipulation process of encoding messages or information in such a way that eavesdroppers or hackers cannot read it, but that authorized parties can. In an encryption scheme, the message or information, sometimes referred to as plaintext, is encrypted using an encryption algorithm, turning it into an unreadable ciphertext. This is usually done with the use of an encryption key, which specifies how the message is to be encoded.

Within the context of the present application, the term "decryption" may refer to a data manipulation process reverse to encryption, so of decoding unreadable ciphertext back into the original plaintext. This is usually done with the use of a decryption key, which specifies how the message is to be decoded.

Within the context of the present application, the term "authentication" may refer to an act of confirming the authenticity of an entity. This might involve confirming the identity of an entity, so ensuring that an entity actually is what it claims to be. Authentication involves verifying the validity of identifications. IKE (RFC2409) and IKEv2 (RFC4306) are examples of key management protocols also used to authenticate the remote peer.

Within the context of the present application, the term "authorization" may refer to the process of granting access rights to data, resources, or an entity. In a first step the peer is authenticated, so it is confirmed that the peer is what it claims to be. In a second step it can then be verified whether the peer is allowed to access certain data, resources, or an entity. Authorization can be based on data administered in the node by the operator of the communication network.

Referring to FIG. 1, a system for handling PM data in a communication network 100 according to an embodiment is shown.

The communication network 100 may comprise a plurality of network nodes 102. For simplicity reasons only a single network node 102 is shown. It is to be understood that other network nodes 102 of the communication network 100 may comprise similar internal components and may perform similar methods, so network node 102 is to be seen as a model for other network nodes 102.

It is assumed that the network node 102 may collect PM data and therefore may act as a PM data source. The PM data source 104 represents the function of the network node 102 that is generating the PM data. The PM data source 104 may transfer the collected PM data to a PM data collector 112. Sensitive information within the PM data may be encrypted by the PM data collector 112 or the network node 102 prior to the transfer.

The network node 102 may further comprise an encryption key storage 108, where the network node 102 may store encryption keys. This may be a specific memory within the network node 102 or a separate storing unit complying with security standards to protect sensitive data from unauthorized attackers.

The PM data source 104 and the encryption key storage 108 may interact with each other. So the PM data source 104 may query an encryption key from the encryption key storage 108. Responsive to this request, the encryption key storage 108 may deliver the encryption key to the PM data source 104. The PM data source 104 can then use the received encryption key to encrypt sensitive information within the PM data.

The network node 102 may further comprise a key management application 106 responsible for handling the encryption key and the corresponding decryption key.

The encryption key storage 108 and the key management application 106 may interact with each other. So the encryption key storage 108 may request an encryption key from the key management application 106. This may be the case, if the PM data source 104 has requested an encryption key from the encryption key storage 108, but there is no valid and not expired encryption key available in the encryption key storage 108. So in order to respond to the query the encryption key storage 108 has to request a key from the key management application 106. The key management application 106 may deliver an encryption key to the encryption key storage 108.

When receiving a request for an encryption key the key management application 106 may have to perform a key agreement negotiation with a security network operation center 114 on an encryption key and a corresponding decryption key. This key agreement negotiation may be handled by a peer key management application 116 in the security network operation center 114. The key management application 116 in the security network operation center 114 has the task to handle the encryption key and the corresponding decryption key.

The key agreement negotiation between the peering key management applications 106, 116 may take also additional criteria into account. So the encryption key and the corresponding decryption key may be specific for the network node 102. If the network node 102 is known for handling highly sensitive information within the PM data, the agreed encryption key and the corresponding decryption key may have longer keylengths thus the computational complexity is higher.

The encryption key and the corresponding decryption key may also be specific for a confidentiality level of the performance monitoring data. So if the network node 102 is configured to provide PM data of a higher confidentiality level, the agreed encryption key and the corresponding decryption key may be chosen appropriately. The same applies, if the network node 102 is configured to provide PM data of lower confidentiality level. For example, two levels of security may be applied. A first level may contain all aggregated data such as non-confidential performance counters and temporary identification data. A second level may contain all data related to a subscriber such as International Mobile Subscriber Identity (IMSI), International Mobile Equipment Identity (IMEI), or localization data.

By alternative, encryption and decryption keys may be generated for any other partitioning, such as per subscriber transactions or per PM events.

The security network operation center 114 may further comprise a decryption key storage 118, where the security network operation center 114 may store decryption keys. This may be a specific memory within the security network operation center 114 or a separate storing unit complying with security standards to protect sensitive data from unauthorized attackers.

The decryption key storage 118 and the key management application 116 may interact. The key management application 116 may instruct the decryption key storage 118 to store a decryption key resulting from a key agreement negotiation with a network node 102.

The security network operation center 114 may be part of a network management system 110 responsible for the management of the plurality of network nodes 102 of the communication network 100.

The PM data collector 112 may also be part of the network management system 110, or may be a separate entity of the communication network 100. The PM data collector 112 receives PM data from PM data sources 104 of a plurality of network nodes 102. The sensitive information within the PM data may be encrypted.

The PM data collector 112 and the security network operation center 114 may interact with each other. The PM data collector 112 may retrieve a decryption key from the security network operation center 114. Prior to delivery of the decryption key, the security network operation center 114 may determine, whether the PM data collector 112 is authorized to decrypt the sensitive information within the PM data.

Figure 2:
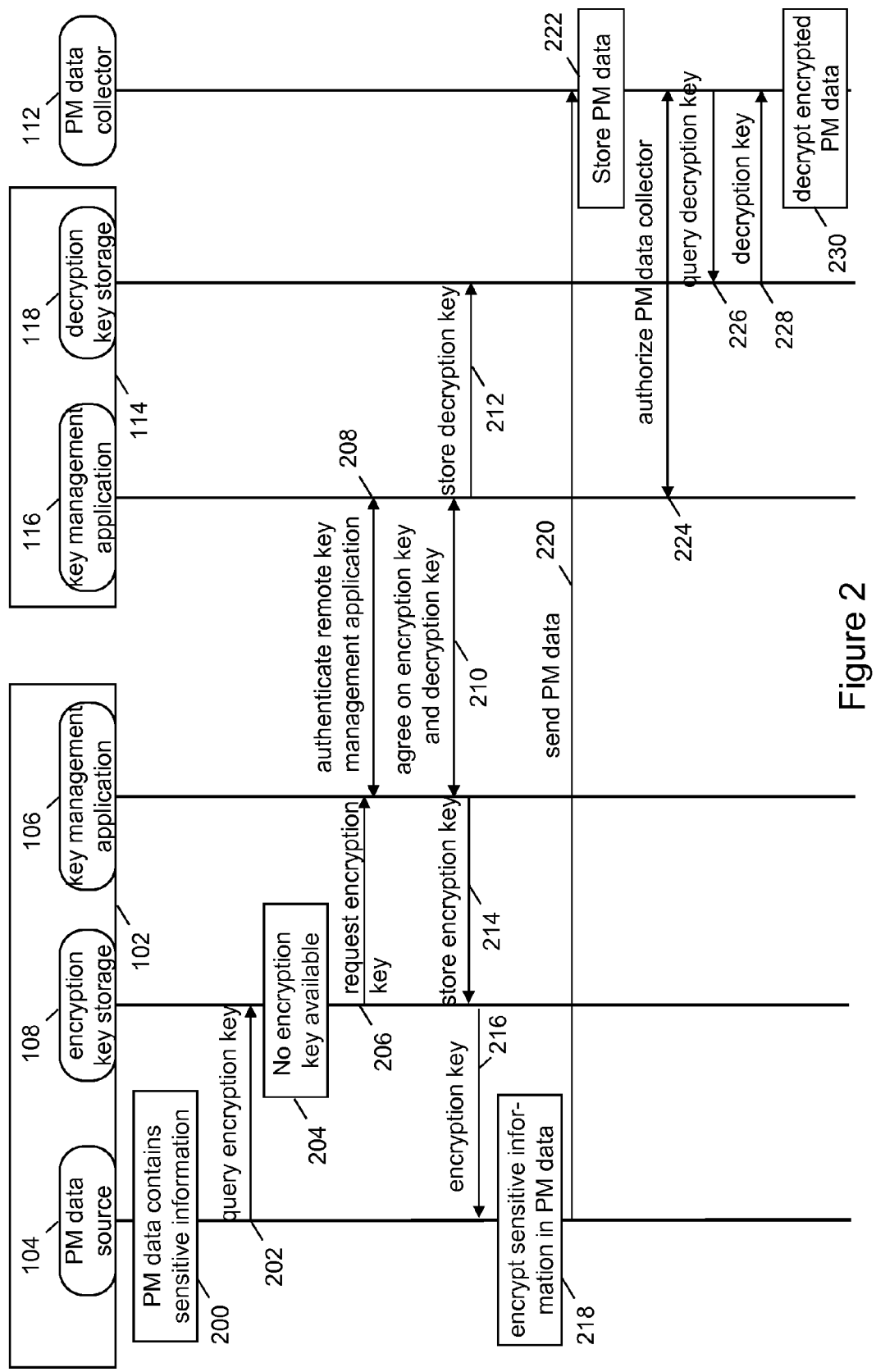
FIG. 2 is a procedure flow diagram illustrating the handling PM data according to an embodiment of the invention.

Referring to FIG. 2, a procedure flow diagram illustrating handling PM data in a communication network 100 according to an embodiment is shown.

This procedure flow details the interaction of the network node 102 with the security network operation center 114 and the PM data collector 112. The procedure also details the interaction of the internal functional units of the network node 102 such as the PM data source 104, the encryption key storage 108, and the key management application 106. The procedure furthermore details the interaction of the internal functional units of the security network operation center 114 such as the key management application 116, and the decryption key storage 118.

The procedure may start when the network node 102 determines whether an encryption condition for encrypting the performance monitoring data is fulfilled. The PM data source 104 may continuously generate PM data. Some of the PM data may contain 200 sensitive data elements, and the network node 102 may determine that these sensitive data elements of the PM data have to be encrypted.

In order to encrypt sensitive data elements of the PM data the PM data source 104 may need an encryption key and may query the encryption key storage 108 to deliver an encryption key. If the encryption key storage 108 has an encryption key available, the encryption key storage 108 may directly deliver the encryption key to the PM data source 104 as done in step 216.

If the encryption key storage 108 has no encryption key available 204, a key agreement condition is fulfilled. So the key agreement condition is fulfilled, if the network node 102 does not have a valid and not expired encryption key available.

The encryption key storage 108 sends 206 a request for an encryption key to the key management application 106. So prior to the step of encrypting, the network node may determine, whether a key agreement condition for agreeing, on an encryption key and a corresponding decryption key is fulfilled.

Based on a result of determining whether the key agreement condition is fulfilled, the network node 102 may perform, an agreement negotiation with the security network operation center 114 on an encryption key and a corresponding decryption key. So the key management application 106 may receive the request 206 from the encryption key storage 108 and may start the agreement negotiation 210 with the security network operation center 114. In this case the peering functional entity in the security network operation center 114 handling the agreement negotiation 210 may be a peer key management application 116.

However, before the agreement negotiation 210 can start both key management applications have to authenticate each other 208 in order to ensure that the negotiation partners are the ones they claim to be. So prior to the step of agreement negotiation with a security network operation center 114, the network node 102 may authenticate 454 the security network operation center 114.

Authentication may be done by using digital certificates issued by a certificate authority (CA).

The term "digital certificate" may particularly refer to an electronic document that may bind a public key with an identity. An identity may herein be, for example, information such as a name of a person, an organization, or a network node. For example, the digital certificate can be used to verify that a public key belongs to a network node. Digital certificates are issued by a trusted CA, which is typically situated in a Network Management Systems (NMS) of the communication network 100.

The term "certificate authority (CA)" may particularly refer to a network entity issuing digital certificates. In a usual communication network, a CA can issue a plurality of, for example hundreds of, digital certificates. A CA may comprise either a self-signed digital certificate or it may comprise a digital certificate, which is signed by another different CA. The CA may also comprise a private key, with which the CA can issue digital certificates for network nodes and with which the CA can sign a record of invalidated and thus revoked digital certificates.

So after the negotiation peer may be authenticated 208, the agreement negotiation 210 may be done.

The agreement negotiation 210 may be done using one of different alternative approaches. One approach may be that the security network operation center 114 signs a public key and sends it to the network node 102. The network node 102 then may send back a proof that may be obtained by signing a message with its digital certificate. By alternative, the encryption key may be pushed to the network node 102 from the security network operation center 114 by configuration management using mechanisms such as netconf (see IETF RFC 6241) or secure corba protocols. Yet another alternative may be to use well known IKE or IKEv2 key exchange to agree a symmetric key and the protection of this key may be done by sending the public key as data.

Agreement on an encryption key and corresponding decryption key may be performed by key management applications 106,116 and may comprise that the key management application 116 at the security network operation center 114 generates and sends (in an authenticated channel) RSA (RSA stands for Ron Rivest, Adi Shamir and Leonard Adleman, who first publicly described the algorithm) public parameters, such as the modulus and the public key exponent, to the key management application 106 at the network node 102. The key management application 106 at the network node 102 may use these parameters as corresponding decryption keys. The RSA private parameters, such as private key exponents, prime numbers, from which the modulus is resulted, the Euler's totient function are generated in the key management application 116 at the security network operation center 114 and stored only in the decryption key storage 118 at the security network operation center 114.

So the agreement negotiation 210 may result into an agreed encryption key and corresponding decryption key. The key management application 116 may forward 212 the decryption key to the decryption key storage 118 for storage.

The key management application 106 may forward 214 the encryption key to the encryption key storage 108 for storage. The encryption key storage 108 then may forward 216 the encryption key to the PM data source 104.

The PM data source 104 then uses the encryption key to encrypt 218 the sensitive data elements of the PM data. So based on the result of determining, whether an encryption condition for encrypting the PM data is fulfilled, the network node 102 may encrypt 218, 408, the PM data.

Subsequent to the encrypting, the network node 102 may send 220, the encrypted performance monitoring data to the PM data collector 112. The PM data collector 112 may then store 222 the received data. Note that this sending of the PM data may be done immediately, or may be buffered and the sending may be triggered by a threshold.

The PM data collector 112 may have to provide 608 the decrypted performance monitoring data to a performance analysis function. The analysis function can handle the PM data only in plaintext format, so encrypted sensitive information in the PM data has to be decrypted first. For decryption of PM data the PM data collector 112 has to obtain the corresponding decryption key from the security network operation center 114. So the PM data collector 112 may determine 600 whether a decryption condition for decrypting PM data is fulfilled.

The PM data collector 112 sends a query 226 for the corresponding decryption key to the decryption key storage 118.

Prior to the step of delivering the corresponding decryption key the security network operation center 114 may determine 552, that the performance monitoring data collector 112 is authorized to decrypt the encrypted performance monitoring data. So the key management application 116 may authorize 224 the PM data collector 112 to decrypt the encrypted performance monitoring data, so verifying that the PM data collector 112 is allowed the decrypt the sensitive information in the PM data.

Based on a result of determining whether a decryption condition is fulfilled, the security network operation center 114 may deliver 228, 554 the corresponding decryption key to the PM data collector 112.

Having received the corresponding decryption key, the PM data collector 112 may decrypt 230 the sensitive information in the PM data and provide the PM data in plaintext format to the analysis function.

Figure 3:
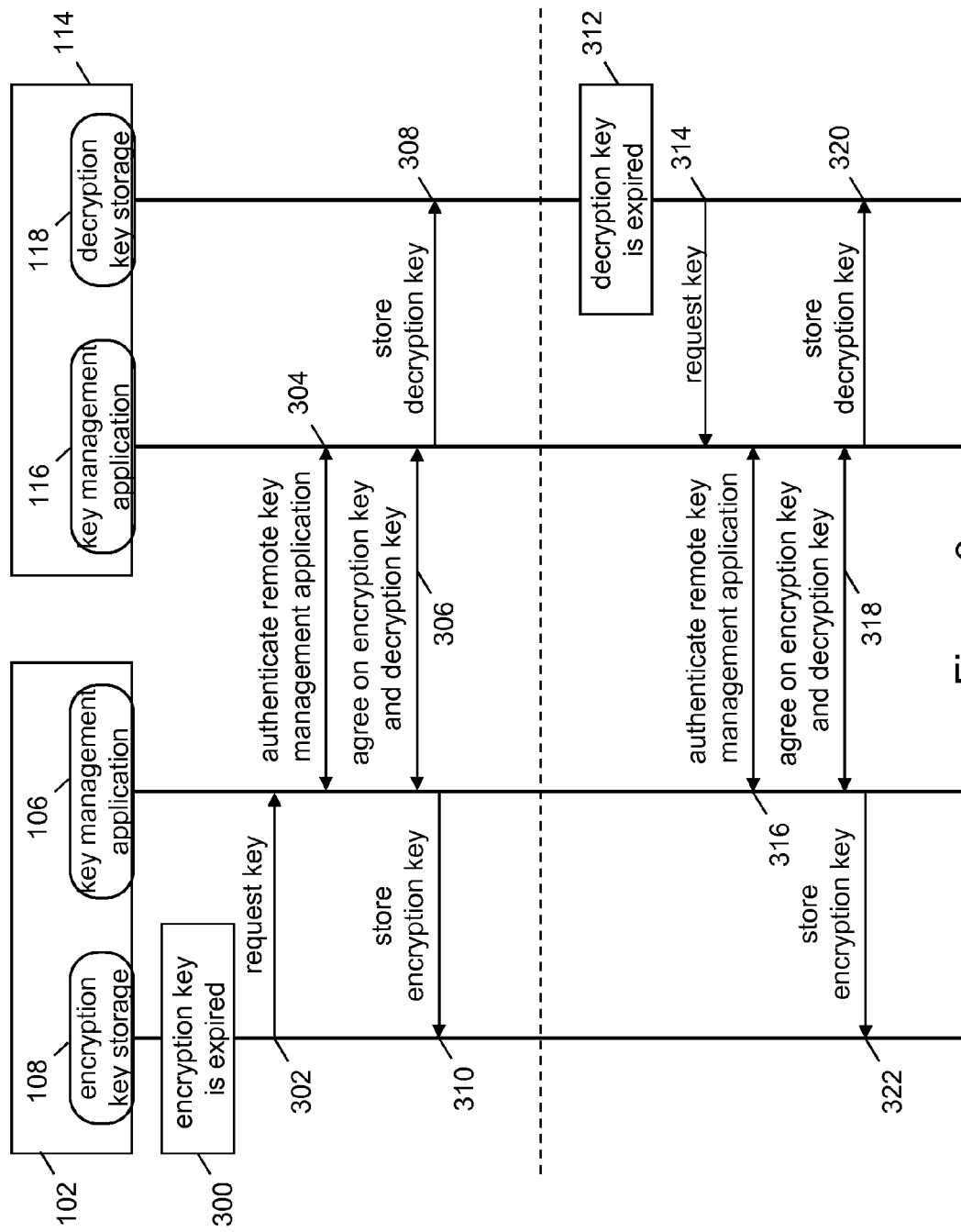
FIG. 3 is a procedure flow diagram illustrating the handling PM data according to an embodiment of the invention.

Referring to FIG. 3, a procedure flow diagram illustrating handling PM data in a communication network 100 according to an embodiment is shown.

The procedure flow details the interaction of the network node 102 with the security network operation center 114. The procedure also details the interaction of the internal functional units of the network node 102 such as the encryption key storage 108, and the key management application 106. The procedure furthermore details the interaction of the internal functional units of the security network operation center 114 such as the key management application 116, and the decryption key storage 118.

A first procedure may start when the network node 102 determines 300 that the stored encryption key has expired. For security reasons encryption keys may be used for a limited time period only, and after expiry of the time period the encryption key may not be used anymore and needs to be replaced.

The encryption key storage 108 sends 302 a request for an encryption key to the key management application 106. So the key management application 106 may receive the request 302 from the encryption key storage 108 and may start the agreement negotiation 306 with the security network operation center 114. In this case the peering functional entity in the security network operation center 114 handling the agreement negotiation 306 may be a peer key management application 116.

However, before the agreement negotiation 306 can start both key management applications 106, 116, have to authenticate each other 304 in order to ensure that the negotiation partners are the ones they claim to be. So prior to the step of agreement negotiation with a security network operation center 114, the network node 102 may authenticate 304 the security network operation center 114.

Authentication may be done by using digital certificates issued by a CA.

So after the negotiation peer may be authenticated 304, the agreement negotiation 306 may be done. The agreement negotiation 306 may result into an agreed encryption key and corresponding decryption key. The key management application 116 may forward 308 the decryption key to the decryption key storage 118 for storage.

The key management application 106 may forward 310 the encryption key to the encryption key storage 108 for storage.

A second procedure may start when the security network operation center 114 determines 312 that the stored decryption key or the encryption key, corresponding to the decryption key has expired. For security reasons decryption keys may be used for a limited time period only, and after expiry of the time period the decryption key may not be used anymore and needs to be replaced.

The decryption key storage 118 sends 314 a request for a decryption key to the key management application 116. So the key management application 116 may receive the request 314 from the decryption key storage 118 and may start the agreement negotiation 318 with the network node 102. In this case the peering functional entity in the network node 102 handling the agreement negotiation 318 may be a peer key management application 106.

However, before the agreement negotiation 318 can start both key management applications 106, 116, have to authenticate each other 316 in order to ensure that the negotiation partners are the ones they claim to be. So prior to the step of agreement negotiation 318 with a network node 102, the security network operation center 114, may authenticate 316 the network node 102.

Authentication may be done by using digital certificates issued by a CA.

So after the negotiation peer may be authenticated 316, the agreement negotiation 318 may be done. The agreement negotiation 318 may result into an agreed encryption key and corresponding decryption key. The key management application 116 may forward 320 the decryption key to the decryption key storage 118 for storage.

The key management application 106 may forward 322 the encryption key to the encryption key storage 108 for storage.

Figure 4A:
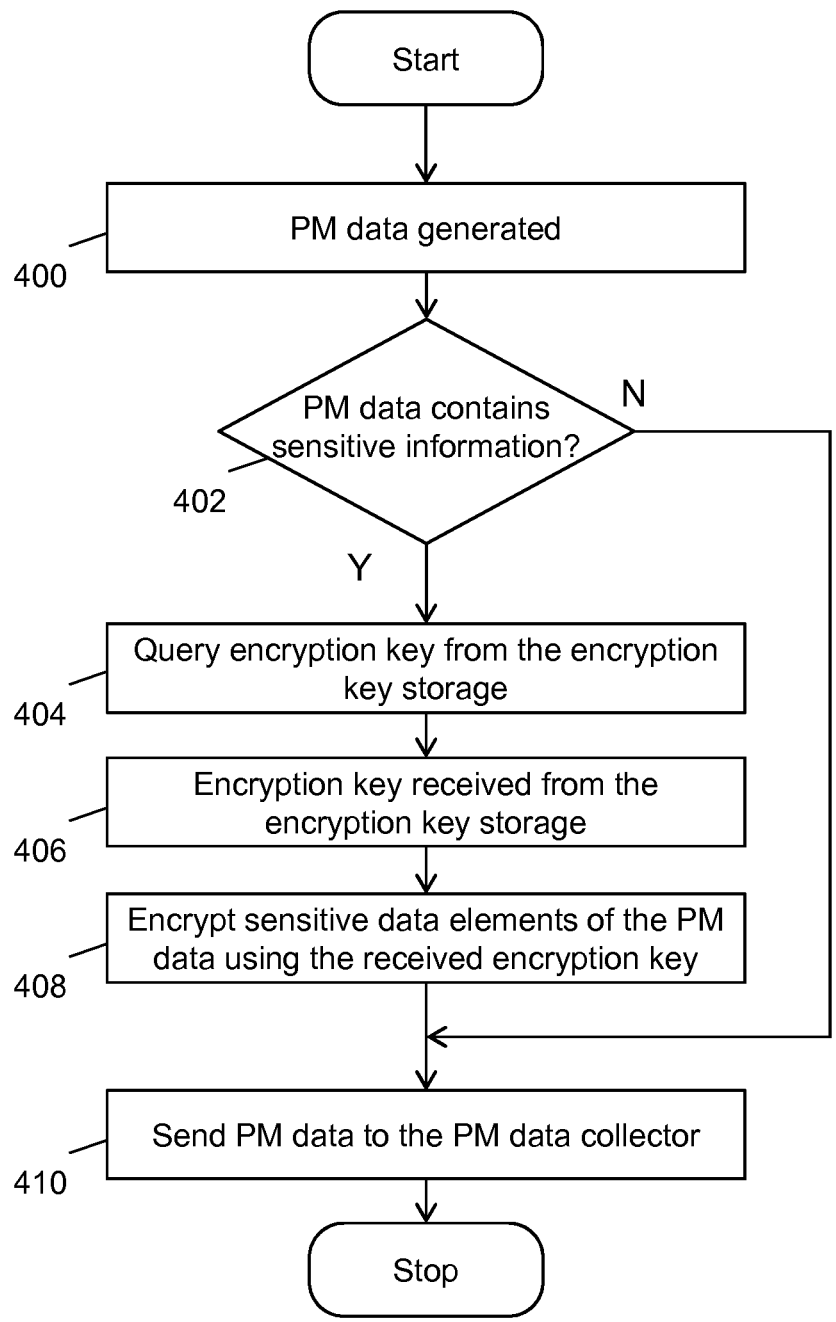
FIG. 4a is a flow diagram illustrating a first method in a network node for handling PM data according to an embodiment of the invention.

Referring to FIG. 4a, a flow diagram illustrating a first method in a network node 102 for handling PM data in a communication network 100 according to an embodiment is shown.

In step 400 the network node 102 may be configured to generate PM data. The PM data may be generated by the PM data source 104.

In step 402 the network node 102 may determine whether the PM data contain sensitive information, so information that requires encryption. If the answer is no, so there is no sensitive information in the PM data, the flow may continue with step 410, where the PM data may be sent to the PM data collector 112. If the answer is yes, so there is sensitive information in the PM data, the flow may continue with step 404.

In step 404 the PM data source 104 within the network node 102 may query an encryption key from the encryption key storage 108.

The queried encryption key may be received in the PM data source 104 from the encryption key storage 108 in step 406.

In step 408 the PM data source 104 in the network node 102 may encrypt sensitive elements of the PM data using the received encryption key.

In step 410 the PM data source 104 in the network node 102 may send the PM data to the PM data collector 112 and the flow ends. Note that this sending of PM data may be done immediately, or the PM data may be buffered and the PM data may be sent when a threshold is reached. If PM data are buffered, by alternative, the encryption of sensitive elements of the PM data using the received encryption key may take place also when the PM data are taken from the buffer and just before sending the PM data.

Note that the encryption key may not exist in network node 102 when the encrypted PM data is sent 410 to the PM data collector 112, i.e. the network node 102 deletes the encryption key right after encryption of the PM data.

The steps 400-410 are a continuous process within the network node 102 that may be executed for the continuous PM data, the PM data being a stream of data characterizing the performance of the network node.

Figure 4B:
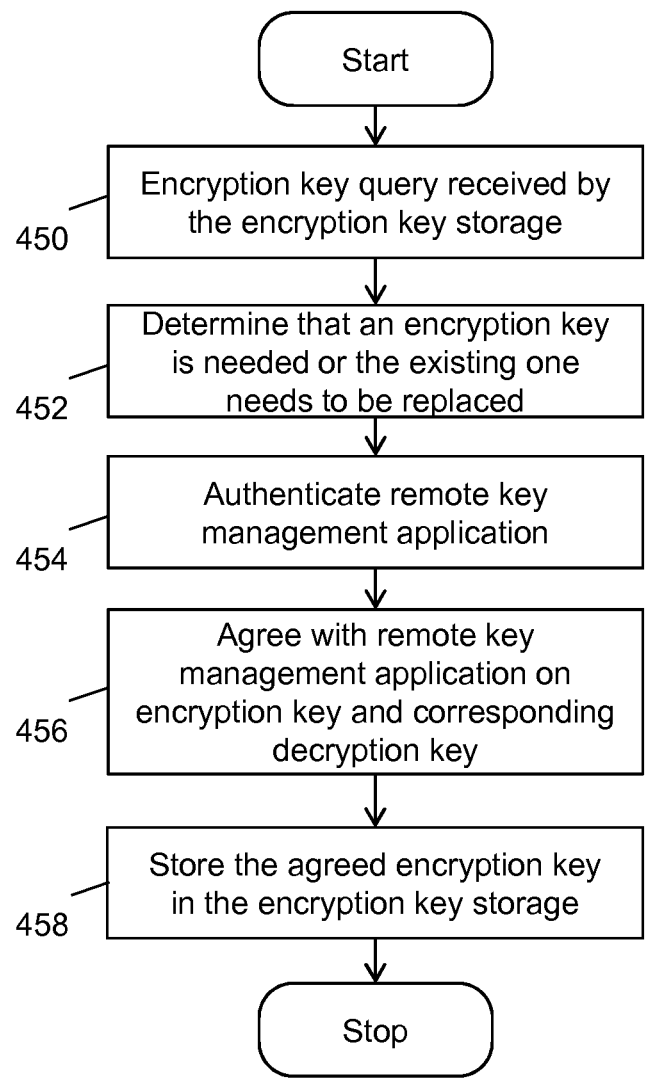
FIG. 4b is a flow diagram illustrating a second method in a network node for handling PM data according to an embodiment of the invention.

Referring to FIG. 4b, a flow diagram illustrating a second method in a network node 102 for handling PM data in a communication network 100 according to an embodiment is shown.

In step 450 the encryption key storage 108 a network node 102 may receive a query for an encryption key.

In this case in step 452 the encryption key storage 108 in a network node 102 may have to determine whether there is a valid and not expired encryption key available in the encryption key storage 108. It may also be the case that there is an encryption key available, but the encryption key need to be replaced with a new one as it has expired.

If an encryption key is needed or the existing one needs to be replaced, in step 454 the remote key management application 116 in the security network operation center 114 may be authenticated. Step 454 may be performed by the key management application 106 of the network node 102.

After successful authentication of the remote key management application 116, the key management application 106 of the network node 102 and the remote key management application 116 in the security network operation center 114 may negotiate and agree in step 456 on an encryption key and corresponding decryption key.

In step 458 finally the network node 102 stores the agreed encryption key in the encryption key storage 108 and the flow ends.

Figure 5A:
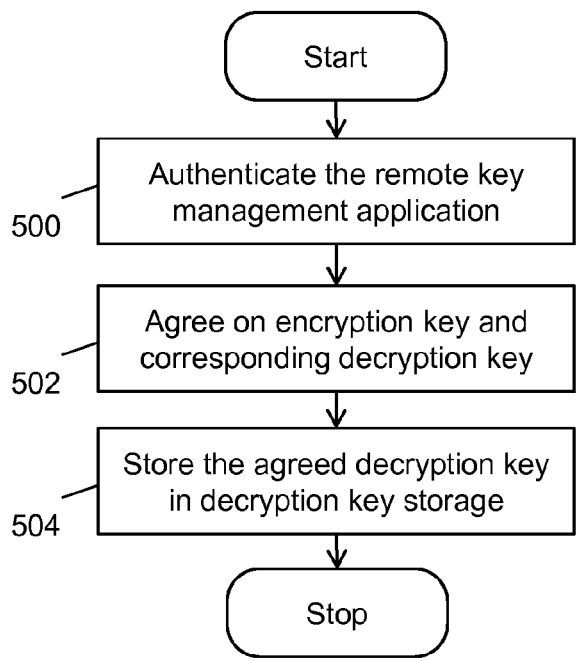
FIG. 5a is a flow diagram illustrating a first method in a security network operation center for handling PM data according to an embodiment of the invention.

Referring to FIG. 5a, a flow diagram illustrating a first method in a security network operation center 114 for handling PM data in a communication network 100 according to an embodiment is shown.

In step 500 the security network operation center 114 may receive an authentication request from a network node 102. In this case the key management application 116 in the security network operation center 114 receives this request. Then the management application 116 authenticates the remote management application 106 of the network node 102.

In the next step 502 the remote key management application 106 of the network node 102 and the key management application 116 in the security network operation center 114 may negotiate and agree on an encryption key and corresponding decryption key.

In step 504 finally the security network operation center 114 stores the agreed decryption key in the decryption key storage 118 and the flow ends.

Figure 5B:
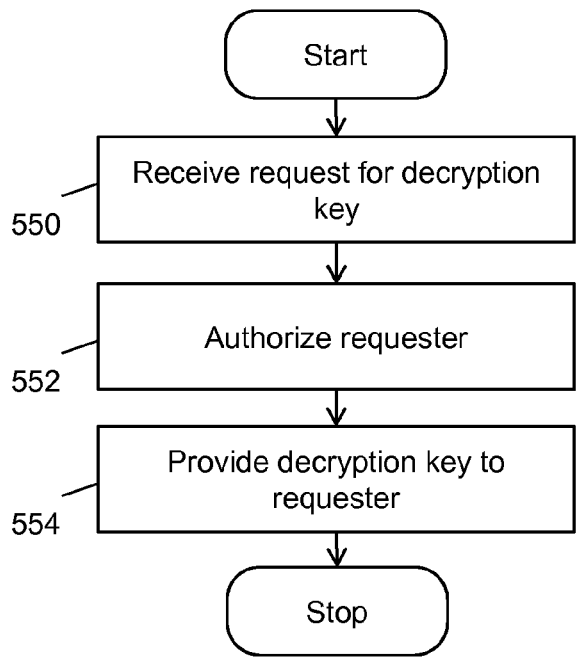
FIG. 5b is a flow diagram illustrating a second method in a security network operation center for handling PM data according to an embodiment of the invention.

Referring to FIG. 5b, a flow diagram illustrating a first method in a security network operation center 114 for handling PM data in a communication network 100 according to an embodiment is shown.

In step 550 the security network operation center 114 may receive a request for the decryption key. This request may originate from a PM data collector 112.

In step 552 the security network operation center 114 may have to authorize that the requester for the decryption key is allowed to decrypt sensitive information in the PM data. If the requester is not authorized, the decryption key is not provided to the requester.

If the requester is authorized, the decryption key is provided in step 554 to the requester and the flow ends.

Figure 6:
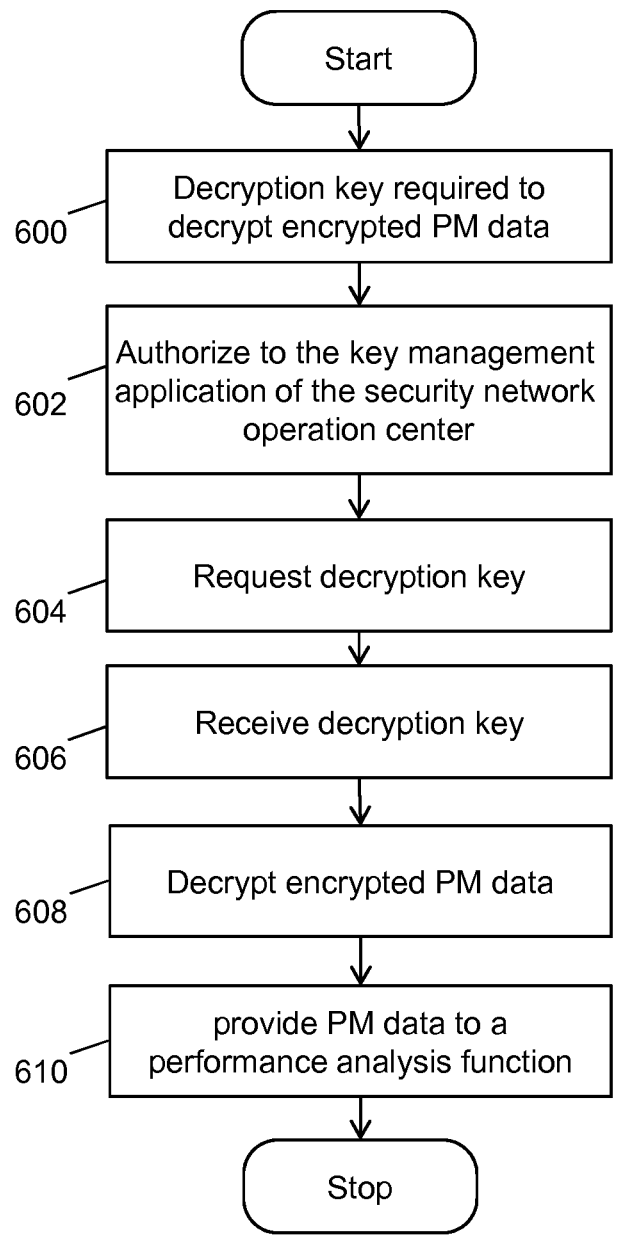
FIG. 6 is a flow diagram illustrating a method in a PM data collector for handling PM data according to an embodiment of the invention.

Referring to FIG. 6, a flow diagram illustrating a method in a PM data collector 112 for handling PM data in a communication network 100 according to an embodiment is shown.

In step 600 the PM data collector 112 may determine that PM data is to be provided to a performance analysis function. However, the sensitive information in the PM data may be encrypted and therefore the PM data collector 112 requires a corresponding decryption key for decryption of the encrypted PM data.

In step 602 the PM data collector 112 may contact the security network operation center 114. The key management application 116 in the security network operation center 114 may handle this. The PM data collector 112 has to be authorized by key management application 116, so it may have to authorize that the PM data collector 112 is allowed to decrypt sensitive information in the PM data. If the PM data collector 112 is not authorized, the decryption key is not provided to the PM data collector 112.

If the PM data collector 112 is authorized by the key management application 116, the PM data collector 112 may request in step 604 the decryption key from the decryption key storage 118.

The PM data collector 112 may receive the decryption key from the decryption key storage 118 in step 606 and may decrypt the encrypted PM data in step 608 using the received decryption key.

In step 610 the PM data collector 112 may provide the PM data to the performance analysis function and the flow ends.

Figure 7:
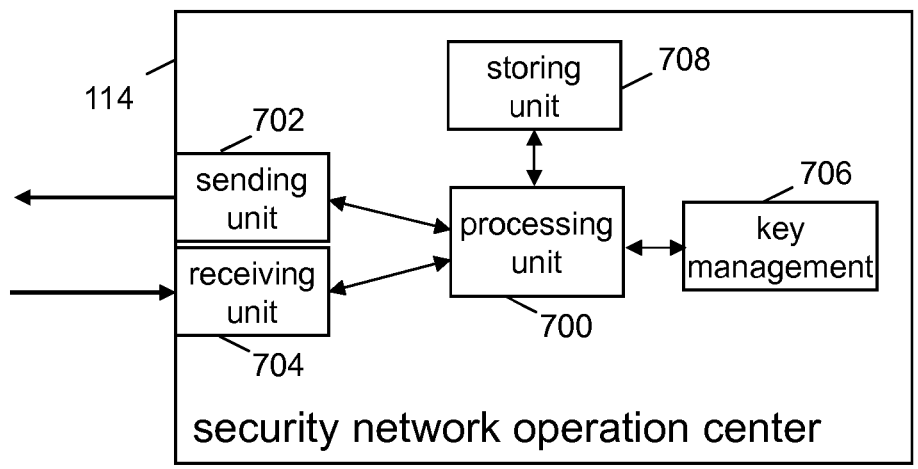
FIG. 7 is a block diagram illustrating a security network operation center for handling PM data according to an embodiment the invention.

Referring to FIG. 7, a block diagram illustrating a security network operation center for handling PM data in a communication network 100 according to an embodiment is shown. The illustrated entity may correspond to the security network operation center 114 illustrated in FIG. 1. The security network operation center 114 may be adapted to perform one or more steps of the above described method shown in FIG. 5a or FIG. 5b.

The security network operation center 114 may comprise a number of functional units, which are described in further detail below and which are adapted to perform respective method steps.

A processing unit 700 of the security network operation center 114 may be adapted to agree with a network node on an encryption key and a corresponding decryption key. The processing unit 700 may further be adapted to authenticate the network node. The processing unit 700 may further be adapted to authorize a performance monitoring data collector. The processing unit 700 may further be adapted to provide the decryption key to the authorized performance monitoring data collector. The processing unit 700 may further be adapted to monitor expiry of the decryption key. In a practical implementation the processing unit 700 may be one processor taking care of all the above functions, or may also be distributed over more than one processor, wherein the functions are distributed over the available processors.

The security network operation center 114 further comprises a sending unit 702 and a receiving unit 704 via which the security network operation center 114 can communicate with a network node, or with other entities of the communication network. The sending unit 702 may send out signaling messages composed by the processing unit 700. The receiving unit 704 may receive signaling messages originating from other entities of the communication network, and forward the received signaling messages to the processing unit 700 for handling.

The network operation center 114 may also comprise a storing unit 708 for storing information related to the handling of handling PM data. The storing unit 708 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 708 may be used by the processing unit 700 to store information, for example an agreed decryption key, an agreement negotiation state, or program code.

The network operation center 114 may also comprise a key management functional unit 706. The key management functional unit 706 may be adapted to perform the functions of the key management application 116 of FIG. 1. It may agree with a network node on an encryption key and a corresponding decryption key. The key management functional unit 706 may further be adapted to authenticate the network node. The key management functional unit 706 may further be adapted to authorize a performance monitoring data collector. The key management functional unit 706 may be adapted to agree with a network node on an encryption key and a corresponding decryption key.

Figure 8:
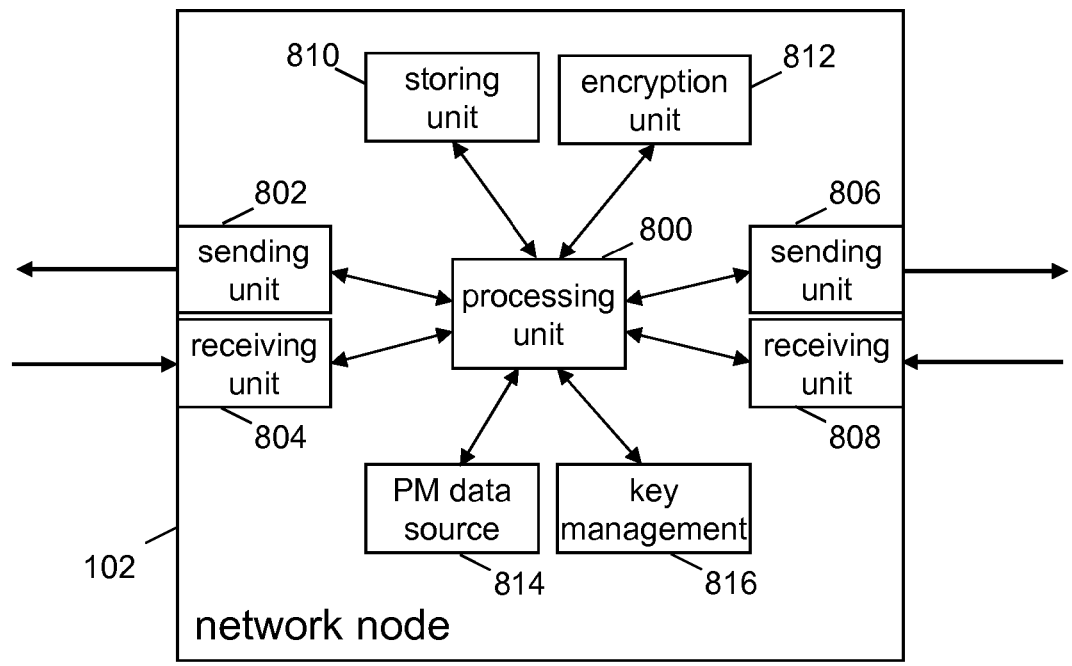
FIG. 8 is a block diagram illustrating a network node for handling PM data according to an embodiment the invention.

Referring to FIG. 8, a block diagram illustrating a network node 102 for handling PM data in a communication network 100 according to an embodiment is shown. The illustrated entity may correspond to the network node 102 illustrated in FIG. 1. The network node 102 may be adapted to perform one or more steps of the above described method shown in FIG. 4a or FIG. 4b.

A processing unit 800 of the network node 102 may be adapted to generate performance monitoring data. The processing unit 800 may further be adapted to determine sensitive data elements of the performance monitoring data. The processing unit 800 may further be adapted to encrypt sensitive data elements of the performance monitoring data using an encryption key. The processing unit 800 may further be adapted to send performance monitoring data to a performance monitoring data collector. The processing unit 800 may further be adapted to agree with an authenticated security network operation center on an encryption key and a corresponding decryption key. The processing unit 800 may further be adapted to authenticate the security network operation center. The processing unit 800 may further be adapted to monitor expiry of the encryption key. In a practical implementation the processing unit 800 may be one processor taking care of all the above functions, or may also be distributed over more than one processor, wherein the functions are distributed over the available processors.

The network node 102 may further comprise a sending unit 802 and a receiving unit 804 via which the network node 102 can communicate with a security network operation center. The network node 102 may also comprise a sending unit 806 and a receiving unit 808 via which the network node 102 can communicate with a PM data collector or with other nodes of the communication network. The sending unit 802, 806 and the receiving unit 804, 808 may be part of a respective interface, respectively. Alternatively, the network node 102 may comprise a single send and receive interface. This interface could then be used for both the communication with the security network operation center and with the PM data collector. The sending unit 802, 806 may send out signaling messages composed by the processing unit 800. The receiving unit 804, 808 may receive signaling messages originating from other entities of the communication network, and forward the received signaling messages to the processing unit 800 for handling.

The network node 102 may also comprise a storing unit 810 for storing information related to the handling of PM data. The storing unit 810 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 810 may be used by the processing unit 800 to store information, for example an agreed encryption key, an agreement negotiation state, or program code.

The network node 102 may also comprise a key management functional unit 816. The key management functional unit 816 may be adapted to perform the functions of the key management application 106 of FIG. 1. The key management functional unit 816 may further be adapted to agree with an authenticated security network operation center on an encryption key and a corresponding decryption key. The key management functional unit 816 may further be adapted to authenticate the security network operation center 114.

The network node 102 may also comprise an encryption unit 812. The encryption unit 812 may be adapted to encrypt sensitive data elements of the performance monitoring data using an encryption key. The encryption may be also be performed by specific hardware optimized for data stream encryption.

The network node 102 may also comprise a PM data source 814. The PM data source 814 may correspond to the PM data source 104 of FIG. 1. The network node 102 may collect PM data and therefore may act as a PM data source. The PM data source 814 may represent the function of the network node 102 that is generating the PM data. The PM data source 814 may transfer the collected PM data to a PM data collector. Sensitive information within the PM data may be encrypted by the encryption unit 812 prior to the transfer.

Figure 9:
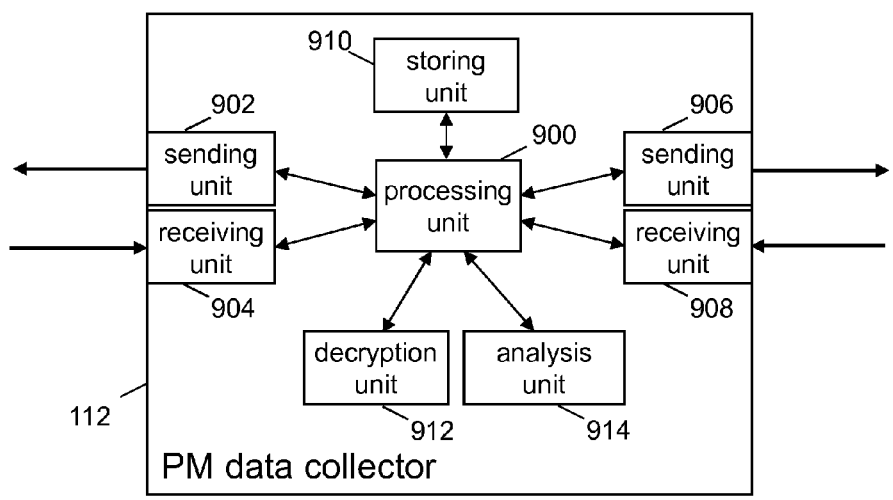
FIG. 9 is a block diagram illustrating a PM data collector for handling PM data according to an embodiment the invention.

Referring to FIG. 9, a block diagram illustrating a PM data collector 112 for handling PM data in a communication network 100 according to an embodiment is shown. The illustrated entity may correspond to the PM data collector 112 illustrated in FIG. 1. The PM data collector 112 may be adapted to perform one or more steps of the above described method shown in FIG. 6.

A processing unit 900 of the PM data collector 112 may be adapted to receive performance monitoring data from a network node 102. The processing unit 900 of the PM data collector 112 may be further adapted to determine whether performance monitoring data is encrypted. The processing unit 900 of the PM data collector 112 may be further adapted to request a decryption key from a security network operation center. The processing unit 900 of the PM data collector 112 may be further adapted to authorize to a security network operation center. The processing unit 900 of the PM data collector 112 may be further adapted to decrypt encrypted performance monitoring data. The processing unit 900 of the PM data collector 112 may be further adapted to provide the decrypted performance monitoring data to a performance analysis function. In a practical implementation the processing unit 900 may be one processor taking care of all the above functions, or may also be distributed over more than one processor, wherein the functions are distributed over the available processors.

The PM data collector 112 may further comprise a sending unit 902 and a receiving unit 904 via which the PM data collector 112 can communicate with a security network operation center. The PM data collector 112 may also comprise a sending unit 906 and a receiving unit 908 via which the PM data collector 112 can communicate with a network node or with other nodes of the communication network. The sending unit 902, 906 and the receiving unit 904, 908 may be part of a respective interface, respectively. Alternatively, the PM data collector 112 may comprise a single send and receive interface. This interface could then be used for both the communication with the security network operation center and with the network node. The sending unit 902, 906 may send out signaling messages composed by the processing unit 900. The receiving unit 904, 908 may receive signaling messages originating from other entities of the communication network, and forward the received signaling messages to the processing unit 900 for handling.

The PM data collector 112 may also comprise a storing unit 910 for storing information related to the handling of handling PM data. The storing unit 910 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 910 may be used by the procession unit 900 to store information, for example received PM data or program code.

The PM data collector 112 may also comprise a decryption unit 912. The decryption unit 912 may be adapted to decrypt the performance monitoring data with a decryption key received from the security network operation center 114. The decryption may be also be performed by specific hardware optimized for data stream decryption.

The PM data collector 112 may also comprise an analysis unit 914. The analysis unit 914 may perform the process of assessing the collected PM data and, by applying specific filter and correlation functions, derive key performance parameters characterizing the network node 102 and the overall communication network. The analysis unit 914 may be an internal unit of the PM data collector 112 or may also be located external. In the latter case, the collected PM data are forwarded to the external analysis unit 914 via one of the network interfaces 902, 904, or 906, 908.

According to another embodiment, a computer program is provided. The computer program may be executed by the processing units 700, 800, 900 of the above mentioned entities 102, 112, 114 such that a method for handling PM data as described above with reference to FIGS. 2 to 6 may be carried out or be controlled. In particular, the entities 102, 112, 114 may be caused to operate in accordance with the above described method by executing the computer program.

The computer program may be embodied as computer code, for example of a computer program product. The computer program product may be stored on a computer readable medium, for example a disk or the storing unit 708, 810, 910 of the entities 102, 112, 114, or may be configured as downloadable information.

One or more embodiments as described above may enable at least one of the following technical effects:

- An improved handling of performance monitoring data in a communication network in terms of improved confidentiality and privacy of subscriber data.
- PM data collected, encrypted and buffered within a network node 102 are secure as the network node does not have the corresponding decryption key.
- In case the sensitive data is encrypted and the plaintext containing privacy information in cleartext is erased from the network node, then the attacker is unable to restore and obtain the sensitive data in the network node. This is useful in such circumstances, where the attacker forces the network node to store the PM data e.g. by blocking the retrieval of PM data.
- An unauthorized PM data collector cannot decrypt PM data.
- Sensitive PM data is protected at the PM collector, thus an attacker on the PM collector is unable to access sensitive data, unless the attacker has the decryption key. It is reasonable that there may be several PM collectors across the communication network, and most of them are considered as deployed into highly untrusted environment. These PM collectors have a high likelihood for attacks. An attacker taking control on such nodes will not be able to obtain the sensitive privacy information. Sensitive information may be served (decryption keys are provided to) only for limited, trusted PM collectors in a secure environment.
- Allows for different levels of security, depending on the confidentiality level of the PM data and the type of network node 102.
- Encryption and corresponding decryption keys have time limited validity and may be replaced after expiry.
- In case an attacker obtains a decryption key by breaking into the PM data collector and obtaining the decryption key in memory currently used for some operation, then the attacker can obtain only a small portion of sensitive data, which is protected by the particular decryption key. Sensitive data protected by different keys may not be possible to obtain.
- The decryption key storage may only store decryption keys if there is a license for this feature. With this licensing, privacy concerns of some legislation may be eliminated.
- Privacy related data retention can be managed by the decryption keys. In case decryption keys are destroyed, then the privacy related data content cannot be restored. It is reasonable that the data retention for privacy is much shorter than the data retention of other information. With this solution the other information is kept, while the privacy concern is eliminated.

Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, in a network node, for handling performance monitoring data in a communication network, the communication network comprising a plurality of network nodes, the method comprising:
   authenticating a security network operation center;
   agreeing with the authenticated security network operation center on an encryption key;
   storing the encryption key;
   monitoring expiration of the encryption key;
   generating performance monitoring data, the performance monitoring data being a stream of data characterizing performance of the network node;
   determining sensitive data elements of the performance monitoring data;
   determining whether an encryption condition for encrypting the performance monitoring data is fulfilled;
   based on the result of the determining whether the encryption condition is fulfilled, encrypting the sensitive data elements of the performance monitoring data using the encryption key; and
   subsequent to the encrypting, sending, by the network node, the encrypted performance monitoring data to a performance monitoring data collector.

2. The method of claim 1, further comprising:
   prior to the encrypting, the network node determining whether a key agreement condition for agreeing on the encryption key and a corresponding decryption key is fulfilled; and
   based on a result of determining whether the key agreement condition is fulfilled, the network node performing an agreement negotiation with the security network operation center on the encryption key and the corresponding decryption key.

3. The method of claim 2, wherein the key agreement condition is fulfilled if the network node does not have a valid and not expired encryption key available.

4. The method of claim 2, wherein the encryption key and the corresponding decryption key are specific for the network node.

5. The method of claim 2, wherein the encryption key and the corresponding decryption key are specific for a confidentiality level of the performance monitoring data.

6. The method of claim 1, wherein the performance monitoring data comprises statistical information related to events of a subscriber.

7. The method of claim 6, wherein the events comprise roaming of a subscriber.

8. A method, in a security network operation center, for handling performance monitoring data in a communication network, the communication network comprising a plurality of network nodes; the performance monitoring data being generated by a network node; the performance monitoring data being a stream of data characterizing performance of the network node; the method comprising:
   determining the network node is authorized to negotiate an encryption key and a corresponding decryption key;
   agreeing with the network node on the encryption key and the corresponding decryption key, wherein the encryption key is for encrypting the performance monitoring data and the decryption key is for decrypting the performance monitoring data;
   determining a performance monitoring data collector is authorized to receive the decryption key; and
   delivering the decryption key to the performance monitoring data collector.

9. The method of claim 8, wherein the delivering the decryption key is based on a result of determining whether a decryption condition is fulfilled by a performance monitoring data collector.

10. The method of claim 9, further comprising prior to the delivering the corresponding decryption key, the security network operation center determining that the performance monitoring data collector is authorized to decrypt the encrypted performance monitoring data.

11. A method, in a performance monitoring data collector, for handling performance monitoring data in a communication network comprising a plurality of network nodes; the performance monitoring data being generated by a network node; the performance monitoring data being a stream of data characterizing performance of the network node; the method comprising:
   determining whether a decryption condition for decrypting the performance monitoring data is fulfilled, the performance monitoring data being received from the network node;
   authorizing a security network operation center;
   requesting, based on the result of determining, a decryption key from the authorized security network operation center;
   decrypting the performance monitoring data with the decryption key received from the authorized security network operation center; and
   providing the decrypted performance monitoring data to a performance analysis function.

12. The method of claim 11, wherein the method further comprises receiving from the performance analysis function key parameters characterizing the network node and the communication network, for determining by the performance monitoring data collector performance goals for managing performance of the plurality of network nodes in the communication network.

13. A network node for handling performance monitoring data in a communication network comprising a plurality of network nodes, the network node comprising:
   one or more processing circuits configured to:
     agree with an authenticated security network operation center on an encryption key and a corresponding decryption key;
     generate performance monitoring data, the performance monitoring data being a stream of data characterizing performance of the network node;
     determine sensitive data elements of the performance monitoring data;
     determine whether an encryption condition for encrypting the performance monitoring data is fulfilled;
     based on the result of the determining whether the encryption condition is fulfilled, encrypt the sensitive data elements of the performance monitoring data using the encryption key;
     subsequent to the encrypting, send the performance monitoring data to a performance monitoring data collector;
     authenticate the security network operation center;
     store the encryption key; and
     monitor expiration of the encryption key.

14. A security network operation center for handling performance monitoring data in a communication network comprising a plurality of network nodes; the performance monitoring data being generated by a network node; the performance monitoring data being a stream of data characterizing performance of the network node, the security network operation center comprising:
   one or more processing circuits configured to:
     agree with the network node on an encryption key and a corresponding decryption key for respectively encrypting and decrypting the performance monitoring data;
     authenticate the network node;
     store the agreed decryption key;
     authorize a performance monitoring data collector;
     provide the decryption key to the authorized performance monitoring data collector; and
     monitor expiration of the decryption key.

15. A performance monitoring data collector for handling performance monitoring data in a communication network comprising a plurality of network nodes; the performance monitoring data being generated by a network node; the performance monitoring data collector comprising:
   one or more processing circuits configured to:
     receive the performance monitoring data from the network node, the performance monitoring data being a stream of data characterizing performance of the network node;
     store the performance monitoring data;
     determine whether performance monitoring data is encrypted;
     request a decryption key from a security network operation center;
     authorize to a security network operation center;
     decrypt encrypted performance monitoring data; and
     provide the decrypted performance monitoring data to a performance analysis function.

16. A computer program product stored in a non-transitory computer readable medium for handling performance monitoring data in a communication network, the communication network comprising a plurality of network nodes; the performance monitoring data being generated by a network node; the computer program product comprising software instructions which, when run on one or more processor circuits, causes a performance monitoring data collector to:
- receive the performance monitoring data from the network node, the performance monitoring data being a stream of data characterizing the performance of the network node;
- store the performance monitoring data;
- determine whether performance monitoring data is encrypted;
- request a decryption key from a security network operation center;
- authorize to a security network operation center;
- decrypt encrypted performance monitoring data; and
- provide the decrypted performance monitoring data to a performance analysis function.

17. A computer program product stored in a non-transitory computer readable medium for handling performance monitoring data in a communication network, the communication network comprising a plurality of network nodes; the performance monitoring data being generated by a network node; the performance monitoring data being a stream of data characterizing the performance of the network node; the computer program product comprising software instructions which, when run on one or more processor circuits, causes a security network operation center to:
- agree with a network node on an encryption key and a corresponding decryption key for respectively encrypting and decrypting the performance monitoring data;
- authenticate the network node;
- store an agreed decryption key;
- authorize a performance monitoring data collector;
- provide the decryption key to the authorized performance monitoring data collector; and
- monitor expiration of the decryption key.

* * * * *